(12) United States Patent
Stanich et al.

(10) Patent No.: US 11,184,504 B2
(45) Date of Patent: Nov. 23, 2021

(54) DYNAMIC PRINTING SYSTEM COMPENSATION MECHANISM

(71) Applicants: Mikel Stanich, Longmont, CO (US); Nikita Gurudath, Boulder, CO (US); Larry Ernst, Longmont, CO (US); Walter F. Kailey, Frederick, CO (US)

(72) Inventors: Mikel Stanich, Longmont, CO (US); Nikita Gurudath, Boulder, CO (US); Larry Ernst, Longmont, CO (US); Walter F. Kailey, Frederick, CO (US)

(73) Assignee: Ricoh Company, Ltd., Tokyo (JP)

( * ) Notice: Subject to any disclaimer, the term of this patent is extended or adjusted under 35 U.S.C. 154(b) by 517 days.

(21) Appl. No.: 15/434,272

(22) Filed: Feb. 16, 2017

(65) Prior Publication Data

US 2018/0234582 A1 Aug. 16, 2018

(51) Int. Cl.
*H04N 1/405* (2006.01)
*H04N 1/00* (2006.01)
*H04N 1/60* (2006.01)

(52) U.S. Cl.
CPC ......... *H04N 1/405* (2013.01); *H04N 1/00034* (2013.01); *H04N 1/00037* (2013.01); *H04N 1/00058* (2013.01); *H04N 1/00068* (2013.01); *H04N 1/00087* (2013.01); *H04N 1/00251* (2013.01); *H04N 1/6036* (2013.01)

(58) Field of Classification Search
CPC ............... H04N 1/405; H04N 1/00034; H04N 1/00037; H04N 1/00058; H04N 1/00068; H04N 1/00087; H04N 1/00251
USPC ............................... 358/3.07, 3.06, 1.9, 1.15
See application file for complete search history.

(56) References Cited

U.S. PATENT DOCUMENTS

| | | |
|---|---|---|
| 5,457,541 A | 10/1995 | Burns |
| 5,898,820 A | 4/1999 | Borg et al. |
| 6,181,445 B1 | 1/2001 | Lin |
| 6,191,867 B1 | 2/2001 | Shor et al. |
| 6,185,004 B1 | 6/2001 | Lin |
| 6,554,388 B1 | 4/2003 | Wong et al. |
| 7,190,490 B2 | 3/2007 | Cooper et al. |
| 7,424,169 B2 | 9/2008 | Viassolo et al. |
| 7,431,420 B2 | 10/2008 | Inoue |
| 7,692,832 B2 | 4/2010 | Klassen |
| 7,729,015 B2 | 6/2010 | Mizes et al. |
| 7,780,276 B2 | 8/2010 | Guhse et al. |

(Continued)

FOREIGN PATENT DOCUMENTS

| | | |
|---|---|---|
| JP | 2001-136385 | 5/2001 |
| JP | 2002-271623 | 9/2002 |

(Continued)

OTHER PUBLICATIONS

Vantram, et al., "Fully Automated Calibration Procedure to Compensate Print Non-Uniformities Incurred in Fixed Print-Head Array Structures", Ricoh Technical Report No. 39, Jan. 2014, pp. 154-160.

*Primary Examiner* — Quang N Vo
(74) *Attorney, Agent, or Firm* — Jaffery Watson Mendonsa & Hamilton LLP

(57) ABSTRACT

A printing system is disclosed. The printing system includes a printer to print image data to a medium and a print controller including a halftone calibration module to dynamically generate calibrated halftones to compensate for optical density changes that occur at the printer.

16 Claims, 8 Drawing Sheets

(56) References Cited

U.S. PATENT DOCUMENTS

| | | |
|---|---|---|
| 7,798,588 B2 | 9/2010 | Arazaki |
| 8,322,811 B2 | 12/2012 | Chandu et al. |
| 8,542,418 B2 * | 9/2013 | Chandu ................ H04N 1/6033 347/10 |
| 8,559,061 B2 | 10/2013 | Kuo et al. |
| 2004/0002023 A1 | 1/2004 | Sowinski |
| 2004/0150844 A1 | 8/2004 | Sanger |
| 2004/0150858 A1 * | 8/2004 | Cholewo ................ H04N 1/407 358/3.06 |
| 2004/0263911 A1 | 12/2004 | Rodriguez |
| 2007/0053003 A1 | 3/2007 | Loce |
| 2007/0064042 A1 | 3/2007 | Sugahara |
| 2008/0158276 A1 | 7/2008 | Kubota |
| 2008/0186340 A1 | 8/2008 | Koyama et al. |
| 2009/0167813 A1 | 7/2009 | Mitchell et al. |
| 2009/0189928 A1 | 7/2009 | Ino et al. |
| 2011/0211008 A1 | 9/2011 | Teshigawara et al. |
| 2011/0235060 A1 | 9/2011 | Tai et al. |
| 2012/0081436 A1 | 4/2012 | Yamada |
| 2012/0229537 A1 | 9/2012 | Ernst et al. |
| 2013/0176600 A1 | 7/2013 | Chandu et al. |
| 2014/0071497 A1 | 3/2014 | Kuno |
| 2016/0100079 A1 | 4/2016 | Gerrits et al. |

FOREIGN PATENT DOCUMENTS

| | | |
|---|---|---|
| JP | 2003118133 | 4/2003 |
| JP | 2015-36709 | 2/2015 |
| WO | 9317867 | 9/1993 |

\* cited by examiner

```
mult_array(:,:,1) =

254  230   90   16    2   25   82  222
  247  214  132   41    8   58  156  189
   99  148  181  140   74  123  173  107
   33   66  165  206  239  197  115   49
    2   25   82  222  255  230   90   16
    8   58  156  189  247  214  132   41
   74  123  173  107   99  148  181  140
  239  197  115   49   33   66  165  206 mult_array(:,:,2) =

252  228   88   14    1   22   80  219
  244  211  129   38    5   55  154  186
   96  145  178  137   71  121  170  104
   30   63  162  203  236  195  112   47
    1   22   80  219  252  228   88   14
    5   55  154  186  244  211  129   38
   71  121  170  104   96  145  178  137
  236  195  112   47   30   63  162  203 mult_array(:,:,3) =

250  225   85   11    0   19   77  217
  241  208  126   36    3   52  151  184
   93  143  175  134   69  118  167  101
   27   60  159  200  233  192  110   44
    0   19   77  217  250  225   85   11
    3   52  151  184  241  208  126   36
   69  118  167  101   93  143  175  134
  233  192  110   44   27   60  159  200
```

| Large | MTA_array(:,:,1) |
| Medium | MTA_array(:,:,2) |
| Small | MTA_array(:,:,3) |
| None | |

Figure 4

DYNAMIC PRINTING SYSTEM COMPENSATION MECHANISM

FIELD OF THE INVENTION

The invention relates to the field of image reproduction, and in particular, to digital halftoning.

BACKGROUND

Conventional inkjet printing systems typically experience dynamic changes in optical density (OD) over time, which prevents optimum print quality. These changes are often attributed to variations in printing system components that may change the amount of ink coverage applied to a medium (e.g., ink properties, printhead variations, etc.). Thus, conventional printing systems rely on periodic maintenance or service operations to compensate for component changes that result in OD drift.

Accordingly, a mechanism to dynamically compensate for OD changes is desired.

SUMMARY

In one embodiment, a printing system is disclosed. The printing system includes a printer to print image data to a medium and a print controller including a halftone calibration module to dynamically generate calibrated halftones to compensate for optical density changes that occur at the printer.

In a further embodiment, a method is disclosed. The method includes dynamically generating calibrated halftones to compensate for optical density changes that occur at a printer.

BRIEF DESCRIPTION OF THE DRAWINGS

A better understanding of the present invention can be obtained from the following detailed description in conjunction with the following drawings, in which:

FIG. 4 illustrates one embodiment of multi-bit threshold arrays;

DETAILED DESCRIPTION

A halftone calibration mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
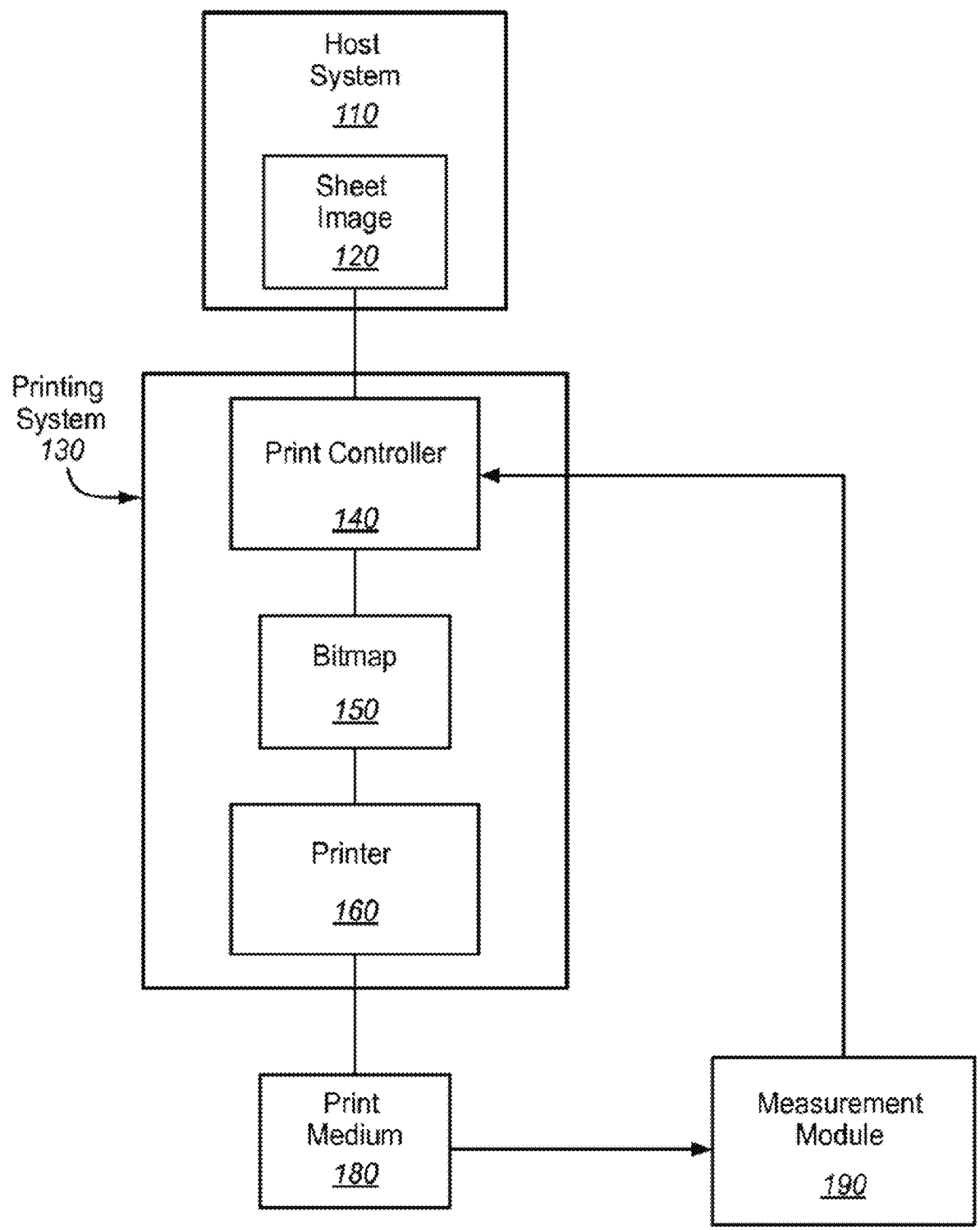
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a halftone calibration system to obtain measurements of the printed medium 180. The measured results are communicated to print controller 140 to be used in the halftone calibration process. The measurement system may be a stand-alone process or be integrated into the printing system 130. According to one embodiment, measurement module 190 is an edge sensor. However in another embodiment, measurement module 190 is a camera system or in-line scanner.

Figure 2:
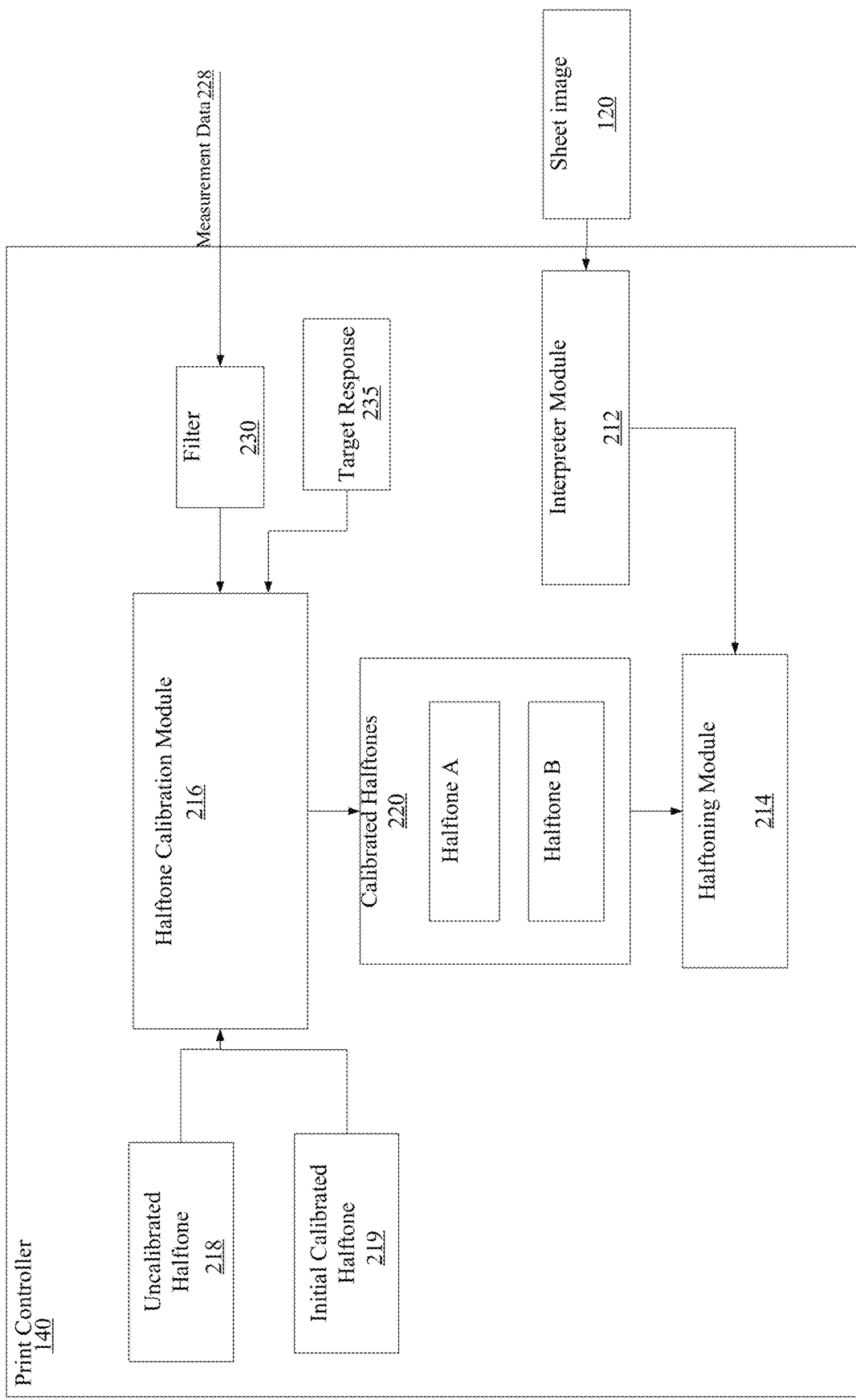
FIG. 2 is a block diagram of one embodiment of a print controller.

FIG. 2 is a block diagram illustrating an exemplary print controller 140. The print controller 140, in its generalized form, includes an interpreter module 212, a halftoning module 214, and a halftone calibration module 216. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of ink or toner. For example, halftoning module 214 may convert the continuous tone image pels to halftone pattern image data of CMYK ink or toner for application to the paper. Thus, halftoning module 214 converts a contone image to a binary/multi-bit level halftone image at the same dots per inch (dpi) as the contone image. Binary halftone image refers to an image having only a single drop size, not including none. Multi-bit refers to when the halftoned image has more than one drop size, not including none. The resulting halftone image data is used to drive a printhead mechanism of the printer 160, which operates at the same dpi as the halftone image data.

Figure 3A:
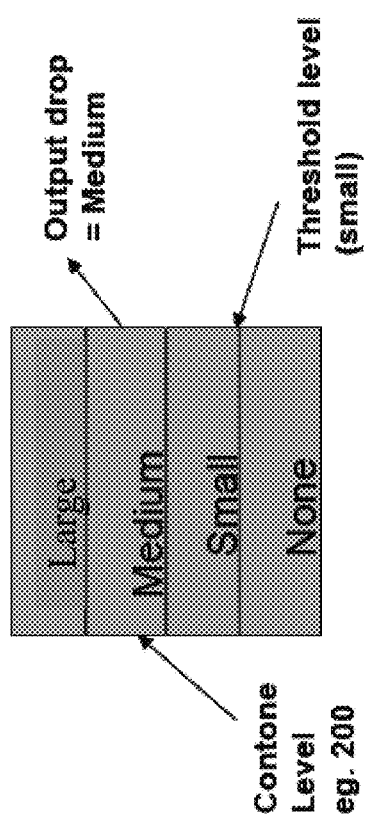
FIGS. 3A & 3B illustrate embodiments of calibrated and un-calibrated halftone output levels.

FIG. 3A illustrates one embodiment of halftone output levels. As shown in FIG. 3A, there are four possible output levels (Large, Medium, Small and None). Further, each output level for a given pel is uniquely defined based on thresholds for each drop size and the image contone level for the corresponding pel of contone image data. A halftone design comprises a set of thresholds which define the output levels for a collection of pels corresponding to input image levels. The set of thresholds for a halftone is defined to be a threshold array (TA). A system having multiple colors includes halftones for each color plane. FIG. 3A depicts the output level for a single corresponding pel of image contone data.

Halftone calibration module 216 performs a calibration process on an un-calibrated halftone 218 received at print controller 140 in order to generate one or more calibrated halftones 220. Multiple halftones are employed to account for detected changes in measured response from the output of the filter block 230. The first calibrated halftone A is used to image data in the halftoning block 214 for a given first period of time, based on an initial set of measurements. During that first period of time halftone calibration module 216 is generating a new calibrated halftone B based on new measurements, which will be used by the halftoning block after the first period of time has elapsed. The second calibrated halftone B is then used for a second period of time while a new halftone is being generated and stored. This process repeats creating new calibrated halftones which are generated to follow response changes of the printer. The calibrated halftone is generated to achieve the target response 235 across the tone range.

Calibrated halftones 220 are then received at halftoning module 214 along with the sheetside bitmap. In one embodiment, multiple calibrated halftones 220 (e.g., halftone A and halftone B) are maintained for generation of dynamically calibrated halftones in order to compensate for OD changes at printing system 130.

The un-calibrated halftone 218 refers to a reference halftone design that is modified to create the calibrated halftones. Measurements of the system response are measured using the un-calibrated halftone. The un-calibrated halftone 218 could also be a calibrated halftone previously generated by halftone calibration module 216 or any preexisting halftone. In this case a further refined calibrated halftone is generated which is created to achieve the target response 235. Again, in this case measurements are made using the previously calibrated halftone. To avoid loss of gray levels or maximum OD (Dmax) during this process a high bit-depth version of the halftone can be used with interpolation to achieve levels between or extrapolated from those in the current calibrated halftone.

In a second embodiment, halftones are periodically calibrated at halftone calibration module 216. For instance, calibrated halftone A may be initially processed at halftoning module 214 for application of sheet image data to the medium. Subsequently, generation of a calibrated halftone B may be triggered upon detection (i.e. determination) of OD changes or another known event change such as a change to the paper or the desired target response 235. Halftone B will then be processed at halftoning module 214 for application of sheet image data to the medium. This process continues with updated halftones A and B being alternatively implemented for print processing as calibration changes occur. In other embodiments, three or more calibrated halftones may be maintained as calibrated halftones 220.

Figure 3B:
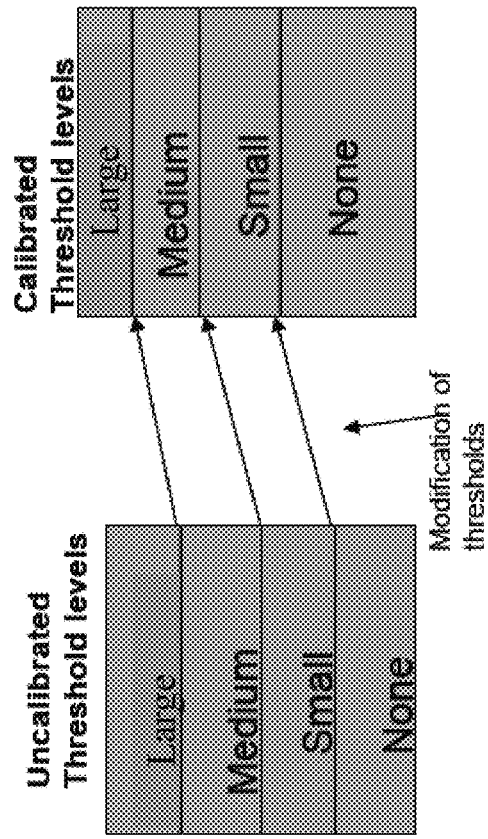

FIG. 3B illustrates one embodiment of halftone output levels for un-calibrated and calibrated halftones implemented by calibration module 216 for a single pel of TA data. As shown in FIG. 3B, calibration involves modification of threshold levels between un-calibrated and calibrated halftones. Un-calibrated and calibrated halftones include threshold values for an entire array width (e.g., 256× 25600×3 thresholds for a 2 bit output level system; where 256 pels is in the direction of web movement, 25600 is the number of nozzles in the ink jet printhead array in the cross web direction and 3 is the number of threshold levels). The number of threshold levels is one less than the total number of drop sizes including none.

In one embodiment, the calibration is performed using multi-bit threshold arrays (MTAs). FIG. 4 illustrates one embodiment of such MTAs. In one embodiment, the maximum value of an MTA is 254, while a minimum value is 0. A maximum value of 254 ensures all large drops are produced at the end of the tonal range by the halftone operation for a level 255. A maximum value of 255 may in some cases be desirable to achieve Dmax reductions where the printer produces an OD which is less than the maximum possible value achievable by the printing process. The Dmax is defined by the target response 235 OD function.

For multi-bit halftones, the MTA is a three-dimensional array consisting of one two-dimensional array for each drop size transition. Thus it includes a set of two-dimensional arrays of thresholds for transition between drop sizes: MTA_array(:,:,1) plane one provides the thresholds for the Large output level, while MTA_array(:,:,2) plane 2 and MTA_array(:,:,3) plane 3 provide thresholds for the Medium and Small output levels respectively for a system having three drop sizes not including none.

The number of planes of threshold data can be extended to handle any number of drop sizes. The data in these two dimensional arrays may be segmented into separate memory regions and stored in any convenient order. For example, the thresholds for each drop size transition may be stored contiguously in memory, and it is often advantageous to do so.

The multi-bit halftoning relationship is represented as Large drop: I>MTA_array(:,:,1); Medium drop: I>MTA_array(:,:,2) & I<=MTA_array(:,:,1); Small drop: I>MTA_array(:,:,3) & I<=MTA_array(:,:,2); and None: I<=MTA_array(:,:,3); where I is the matrix of image contone levels corresponding to the same spatial set of pels which are being halftoned. This defines a point operation which, in turn, defines the output drop size given the contone level for the pel being halftoned.

Halftoning is a bit depth reduction process where the bit depth of the contone data, typically 8 is reduced to a lower value, in this case 2 for a four-level system. Values for a small example 8×8×3 threshold array are shown in FIG. 4.

Thresholds increase for the same row and column for each plane 3 to 2 to 1. This satisfies the halftone stacking condition which states that output levels must always monotonically increase with increasing contone levels. Satisfying the stacking condition is also evident from the totem pole representations shown in FIGS. 3A and 3B.

Figure 6:
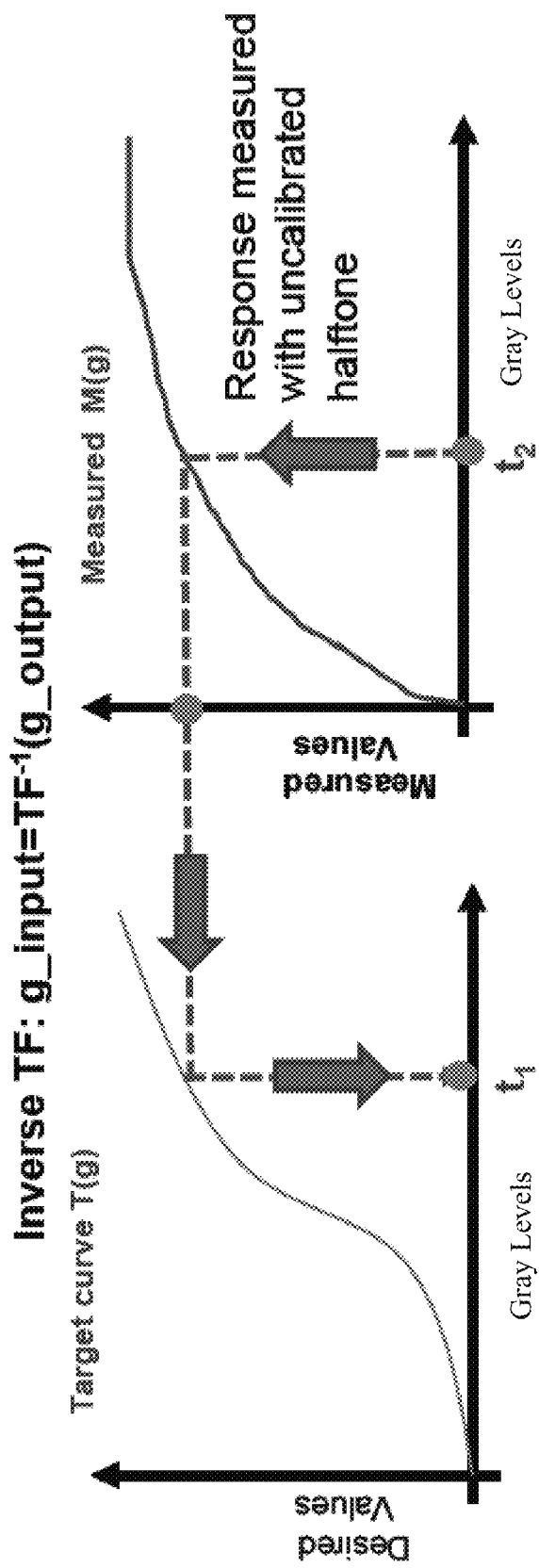
FIG. 6 illustrates one embodiment of an inverse transfer function.

According to one embodiment, halftoning calibration module 216 generates the appropriate threshold values for the calibrated threshold array based on an un-calibrated threshold array and an inverse transfer function (ITF). Thus, halftone calibration module 216 generates a calibrated halftone directly from the un-calibrated halftone and the inverse transfer function by transforming the un-calibrated threshold values to new calibrated halftone threshold values. This process is performed without having to convert to a different halftone representation (e.g. 3D LUT), calibrate and subsequently convert back to a threshold representation. The transfer function (TF) relates the contone level mapping required to achieve the target response 235 based on the measured response. The ITF, used for modifying (i.e. transforming) halftone threshold values, is the inverse of the TF functional relationship. This is shown in FIG. 6.

Figure 5:
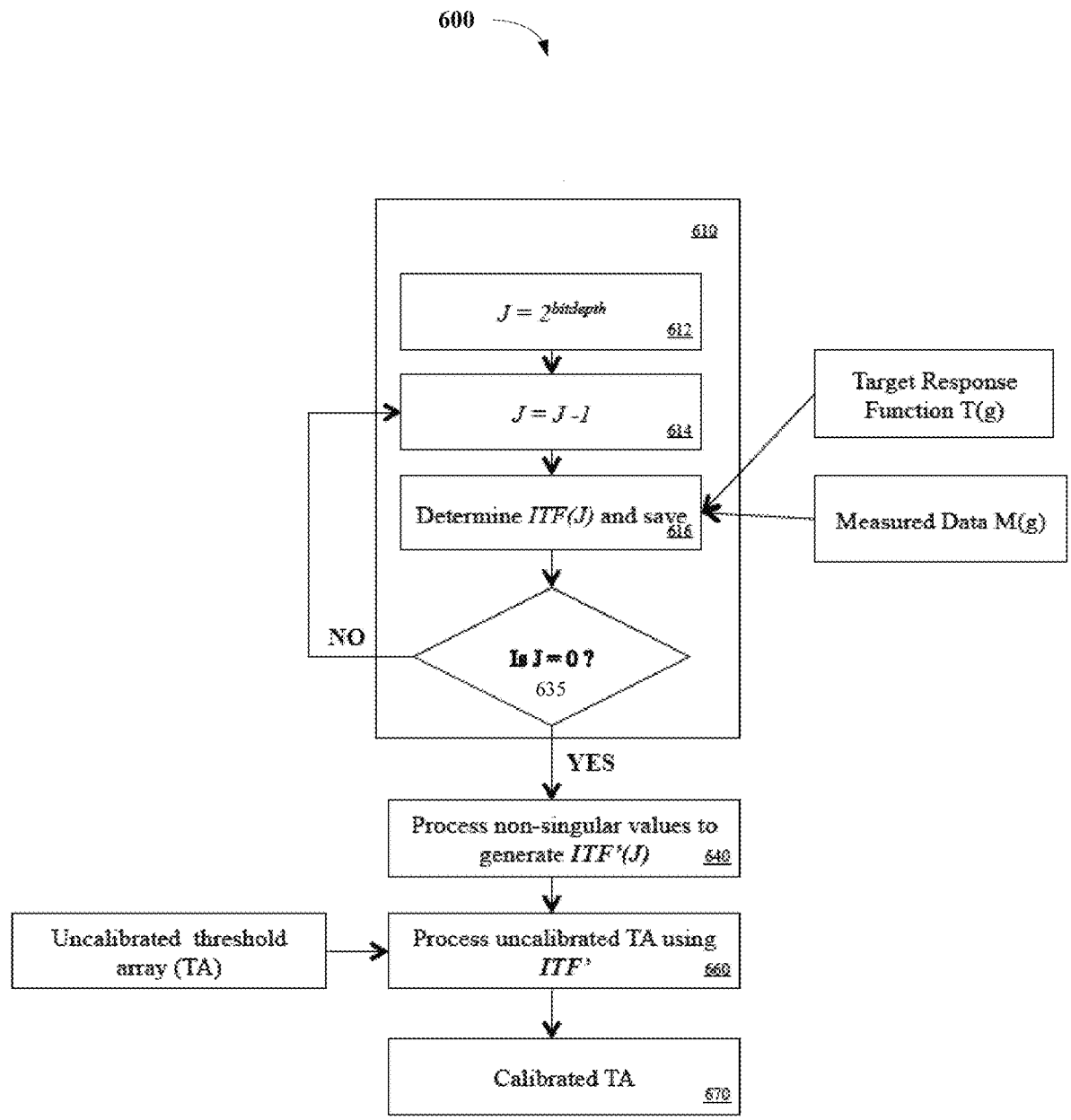
FIG. 5 is a flow diagram illustrating one embodiment of a halftone calibration process.

FIG. 5 is a flow diagram illustrating one embodiment of a process 600 for halftone calibration. Process 600 may be performed by processing logic that may include hardware (e.g., circuitry, dedicated logic, programmable logic, microcode, etc.), software such as instructions run on a processing device, or a combination thereof. In one embodiment, process 600 is performed by halftone calibration module 216.

At processing block 610, an inverse transfer function is generated. To produce a calibrated halftone threshold array, the inverse transfer function is computed for every gray level (J), processing block 612, in which the highest gray level achievable is defined. Values as high as (2^bitdepth)−1 are permitted, 255 for an eight bit system. Thus at processing block 614, the new J value is calculated. Subsequently, the inverse transfer function at this J value is determined from a target response and measured response and saved, processing block 616. This operation continues until J equals zero. Thus at decision block 635, a determination is made as to whether J equals 0. While this process uses integer values, non-integer values or higher bit-depth can be employed to obtain a more accurate estimate to facilitate calibration of higher bit-depth halftones.

The halftone that is employed in block 214 has an input image bit-depth that matches the bit-depth of the contone image generated by the interpreter module 212. Once J equals zero, the non-singular values are processed to obtain ITF'(J), processing block 640. In one embodiment, ITF' represents the inverse transform result after non-singular value processing. In other embodiments, this process could be performed at processing block 616. At processing block 660, the un-calibrated threshold array is processed.

In one embodiment, the processing at block 660 is a simple 1D Look up table operation where all threshold levels from the un-calibrated threshold array are given a replacement value defined by ITF'. For the case of a multi-bit threshold array having multiple planes this is all values for the entire array. No changes for different planes of the array are required. In a further embodiment, converting the continuous function result to a discrete integer representation can be performed at this stage.

At processing block 670, the calibrated threshold array is generated. FIG. 6 illustrates one embodiment of deriving an inverse transfer function (ITF). This ITF relationship in turn is employed to generate a calibrated MTA "CAL_MTA_array" from the un-calibrated threshold array by applying an inverse transform of the transfer function TF to each of the threshold levels of the un-calibrated MTA "MTA_array".

In one embodiment, halftoning module 214 compares the image data (I) at each pel for the sheetside bitmap to the respective threshold data for each plane, where each plane defines thresholds for a particular drop size (e.g., Planes 1,2, and 3 represent the thresholds for the drop size determination). To obtain threshold values for the entire sheetside bitmap the threshold array is tiled to at least cover the entire bitmap. In one embodiment, the multi-bit halftoning relationship is represented as Large drop: I>MTA_array(:,:,1); Medium drop: I>MTA_array(:,:,2) & I<=MTA_array(:,:,1); Small drop: I>MTA_array(:,:,3) & I<=MTA_array(:,:,2); and None: I<=MTA_array(:,:,3).

Assuming calibration using the transfer function in the image path followed by halftoning with an un-calibrated halftone, the halftoned image is to be identical to the result using halftoning employing a calibrated halftone without a transfer function operation. The image data I is transformed using the calibration transfer function.

As discussed above with reference to processing block 660, calibrated thresholds are calculated. The calculations result in the final set of Calibrated MTA threshold values: CAL_MTA_array(:,:,1)=TF$^{-1}$(MTA_array(:,:,1)); CAL_MTA_array(:,:,2)=TF$^{-1}$(MTA_array(:,:,2); and CAL_MTA_array(:,:,3)=TF$^{-1}$(MTA_array(:,:,3)). Therefore, generalizing for any set of threshold data having any number of drop sizes or planes results in CAL_MTA_array=TF$^{-1}$(MTA_array).

Figure 7:
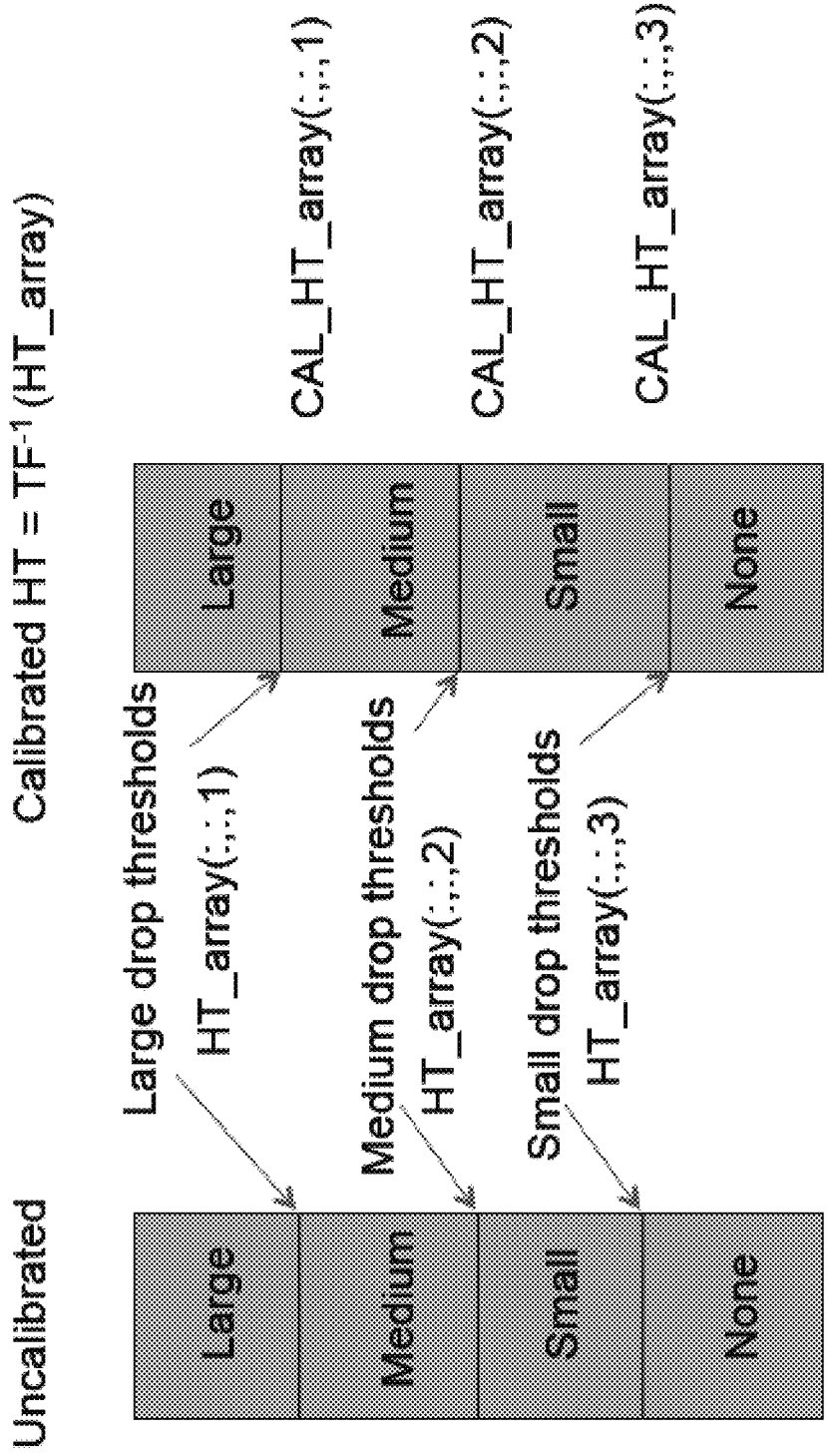
FIG. 7 illustrates one embodiment of un-calibrated and calibrated multi-bit halftone output levels.

In one embodiment, for a Large drop, I>TF$^{-1}$(MTA_array (:,:,1)). Similarly, for Medium, Small and None thresholds I>TF$^{-1}$(MTA_array(:,:,2)) & I<=TF$^{-1}$(MTA_array(:,:,1)); I>TF$^{-1}$(MTA_array(:,:,3)) & I<=TF$^{-1}$(MTA_array(:,:,2)); and None: I<=TF$^{-1}$(MTA_array(:,:,3)), respectively. FIG. 7 illustrates one embodiment of a mapping between calibrated and un-calibrated multi-bit halftone output levels using the inverse transfer function.

Transforming threshold array values using an inverse of the transfer function may result in calibration with fewer gray levels because inverse transfer functions are typically not single valued functions. This reduced number of gray levels occurs if the transfer function is not strictly monotonic or the sequence of input numbers representing the function is not adequate where "flat spots" in the transfer function may exist, having the same output value for multiple input values. To help reduce the potential for "flat spots" by increasing the input numbers by factor of 4, 8, or etc., a much better approximation of the transfer function is achievable.

If the transfer function terms are increased, the image must be upsampled and the halftone bit depth increased to form a consistent set. As discussed above with reference to processing block 640, non-singular values are processed to produce the same results as the LUT halftone calibration method. This would be the case where it is desired to match the results of the LUT halftone calibration method, which is not always a requirement.

According to one embodiment, halftone calibration module 216 periodically generates calibrated halftones for each color using the above-described threshold array modification inverse transfer function process to dynamically compensate for OD changes that occur over time. In this embodiment, calibration module 216 performs dynamic calibrations on an un-calibrated halftone 218, which includes requisite dot gain and uniformity compensation. Initial calibrated halftone 219 may be used by halftone calibration module 216 to start-up the initial printing prior to collection of data and computation of a new halftone to update the system response to new measurements.

In one embodiment, halftone calibration module 216 generates updated calibration halftone based on measurement data 228 received from measurement module 190. In such an embodiment, halftone calibration module 216 dynamically computes the inverse transfer function to achieve a target response 235 based on the measured response. In a further embodiment, a filter 230 is included within print controller 140 to filter measurement data 228 received from measurement module 190 prior to computing the inverse transfer function.

As discussed above, two or more calibrated halftones are maintained and switched once each time a dynamic calibration is performed. Thus, while a first calibrated halftone is being implemented to perform halftoning on image data, halftone calibration module 216 may generate a second calibrated halftone based on received measurement data 228. Once generated, halftoning may be performed using the second calibrated halftone. This dynamic calibration halftone process continues indefinitely during print operations.

In one embodiment, measurement module 190 may be implemented to capture data (e.g., RGB) to create a baseline set of data to used for subsequent OD recalibrations. In this embodiment, the data may be captured at the same time as OD calibrations involving spectral data. Subsequently, the captured data is correlated with the spectral data to enable calibration using measurement module 190.

In an embodiment in which measurement module 190 is implemented using an edge sensor, compensation adjusts for global (i.e. transform all threshold array values) OD response changes based on the measurement data 228 while maintaining original uniformity compensation. In an embodiment in which measurement module 190 is implemented using a full web camera system, compensation may adjust for full width uniformity. In the full web width case, the process is performed at an individual nozzle level which adjusts (i.e. transforms) columns of threshold array values based on the measurement data for the corresponding nozzle. In all cases where measurements are performed, a test chart (i.e. test pattern) of a given design having different tint levels is printed to characterize the system. The full width case implements a full width chart while edge sensing only requires a small linear arrangement of patches.

Figure 8:
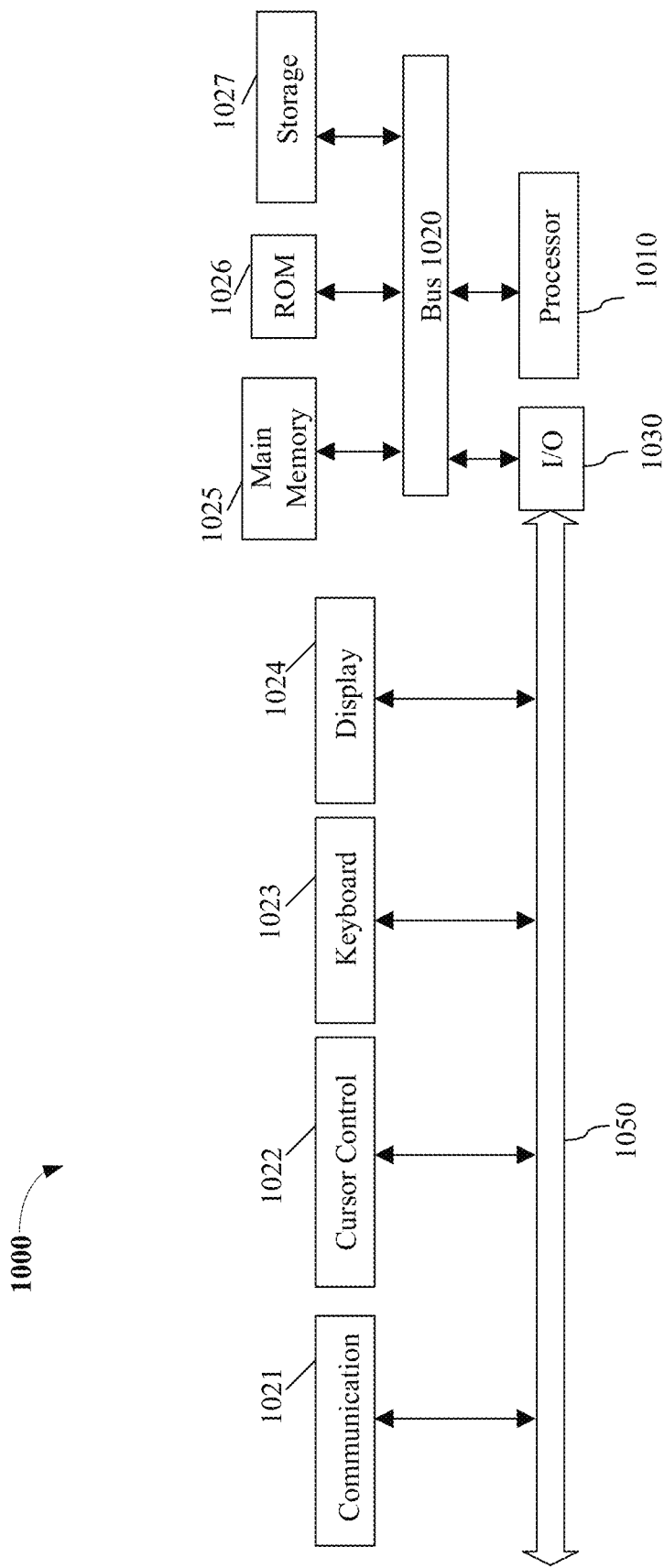
FIG. 8 illustrates one embodiment of a computer system.

FIG. 8 illustrates a computer system 1000 on which printing system 130 and/or halftone calibration module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1025 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
   a print controller including:
   interpreter module to receive print job data and render the print job data into image data;
   a halftone calibration module to dynamically generate calibrated halftones to compensate for optical density changes that occur at the printing system, including generating a first calibrated halftone, receiving measurement data of a printed medium in response to a detection of the optical density changes, generating a second calibrated halftone based on the measurement data, applying the first calibrated halftone to the image data during the generation of the second calibrated halftone and applying the second calibrated halftone to the image data upon completion of the generation of the second calibrated halftone; and
   a halftoning module to perform halftoning on the image data using the first and second calibrated halftones.

2. The printing system of claim 1, wherein the halftone calibration module generating the calibrated halftones comprises receiving an un-calibrated halftone, transforming threshold values in the un-calibrated halftone via an inverse transfer function to generate calibrated halftone threshold values; and generating one or more calibrated halftones based on the calibrated halftone threshold values.

3. The printing system of claim 2, further comprising a measurement module to obtain the measurement data from the image data printed to a medium to detect the optical density changes and transmit the measurement data to the print controller.

4. The printing system of claim 3, wherein the halftone calibration module computes a first inverse transfer function to achieve a target response based on first measurement data.

5. The printing system of claim 4, wherein the halftone calibration module generates the first calibrated halftone based on the first inverse transfer function.

6. The printing system of claim 1, further comprising a printer to print image data to a medium.

7. The printing system of claim 6, wherein the halftone calibration module computes a second inverse transfer function to achieve a target response based on second measurement data during implementation of the first calibrated halftone to perform halftoning.

8. The printing system of claim 7, wherein the halftone calibration module generates the second calibrated halftone based on the second inverse transfer function.

9. The printing system of claim 1, wherein the halftone calibration module generates a calibrated halftone using a multi-bit threshold array (MTA).

10. The printing system of claim 4, wherein the measurement module comprises an edge sensor, wherein the threshold values in the uncalibrated halftone are transformed via the first inverse transfer function.

11. The printing system of claim 4, wherein the measurement module comprises a camera system, wherein the threshold values in the uncalibrated halftone corresponding to the measurement data are transformed via the first inverse transfer function.

12. A non-transitory machine-readable medium including data that, when accessed by a machine, cause the machine to:
 receive print job data;
 render the print job data into image data; and
 dynamically generate calibrated halftones to compensate for optical density changes that occur at a printer, including,
  generating a first calibrated halftone;
  receiving measurement data of a print medium in response to a detection of the optical density changes;
  generating a second calibrated halftone based on the measurement data;
  applying the first calibrated halftone to the image data during the generation of the second calibrated halftone; and
  applying the second calibrated halftone to the image data upon completion of the generation of the second calibrated halftone; and
 halftoning the image data using the first and second calibrated halftones.

13. The machine-readable medium of claim 12, wherein generating the calibrated halftones comprises receiving an un-calibrated halftone, transforming threshold values in the un-calibrated halftone via an inverse transfer function to generate calibrated halftone threshold values, and generating one or more calibrated halftones based on the calibrated halftone threshold values.

14. The machine-readable medium of claim 13, comprising a machine-readable medium including data that, when accessed by a machine, further cause the machine to receive the measurement data from image data printed to a print medium to detect the optical density changes.

15. The machine-readable medium of claim 14, comprising a machine-readable medium including data that, when accessed by a machine, further cause the machine to:
 compute a first inverse transfer function to achieve a target response based on first measurement data;
 generate the first calibrated halftone based on the first inverse transfer function; and
 perform halftoning on the image data using the first calibrated halftone.

16. The machine-readable medium of claim 15, comprising a machine-readable medium including data that, when accessed by a machine, further cause the machine to:
 compute a second inverse transfer function to achieve a target response based on second measurement data;
 generate the second calibrated halftone based on the second inverse transfer function; and
 perform halftoning on the image data using the second calibrated halftone.

* * * * *